E. C. LAWRENCE.

HANGING LAMP.

No. 10,075. Reissued Apr. 4, 1882.

Witnesses:
Albert H. Adams.
Edgar T. Bond

Inventor:
Elijah C. Lawrence
By West & Bond
His Attys.

N. PETERS, Photo-Lithographer, Washington, D. C.

UNITED STATES PATENT OFFICE.

ELIJAH C. LAWRENCE, OF BOSTON, MASSACHUSETTS.

HANGING LAMP.

SPECIFICATION forming part of Reissued Letters Patent No. 10,075, dated April 4, 1882.

Original No. 186,939, dated February 6, 1877. Application for reissue filed August 20, 1881.

*To all whom it may concern:*

Be it known that I, ELIJAH C. LAWRENCE, late of Chicago, in the county of Cook and State of Illinois, now of Boston, Massachusetts, have invented new and useful Improvements in Hanging Lamps; and I do hereby declare the following to be a full, clear, and exact description thereof, which will enable others skilled in the art to which my invention appertains to make and use the same, reference being had to the accompanying drawings, forming part of this specification, in which—

Figure 1:
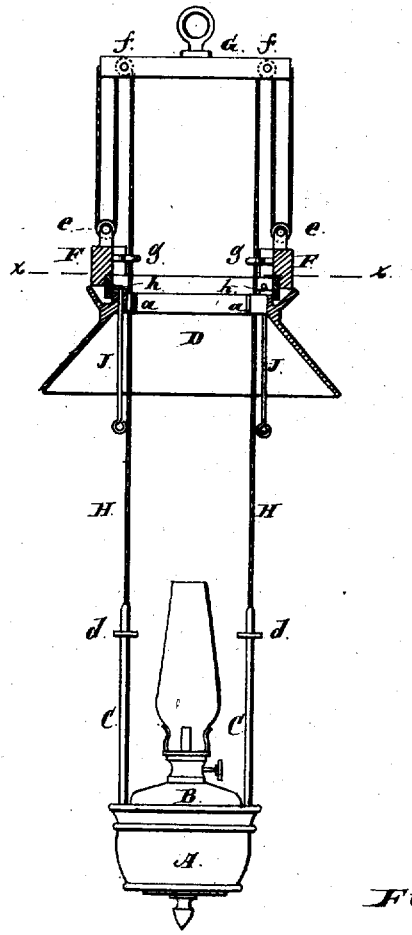
Figure 2:
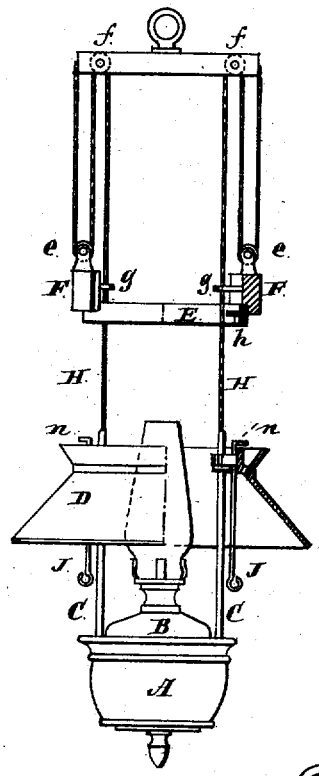
Figure 4:
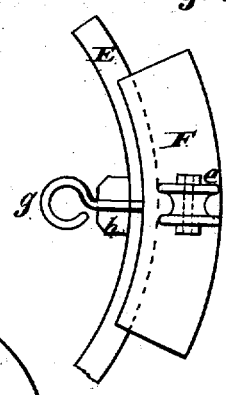
Figure 3:
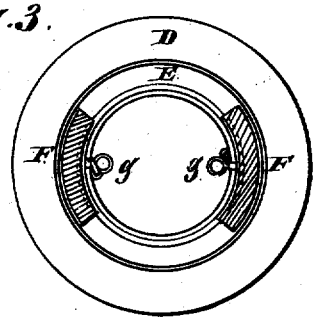

Figure 1 represents a sectional elevation of a hanging lamp embodying my said invention. Fig. 2 represents a front view of the same. Fig. 3 represents a sectional plan of the same, taken on line *x x* in Fig. 1; and Fig. 4 represents an enlarged detail section of the same. Like letters of reference indicate like parts.

My invention relates to that class of hanging lamps supported by cords or chains and so arranged as to admit of raising and lowering the lamp to any desired height; and the objects of my invention are to provide a means of holding the lamp and its shade at any desired height to which they may be adjusted, and also to provide for supporting the lamp-shade so that the shade may be raised from the lamp as the latter is lowered, or may be raised or lowered together with the lamp, as may be desired. These objects I accomplish by means of devices hereinafter fully described.

In the drawings, A represents a lamp-holder, and B the lamp proper, both of which are constructed as usual.

C C are vertical rods, which are permanently attached to the lamp-holder on opposite sides of the same, and extend upward to, or nearly to, the top of the lamp-chimney, and are each provided near the upper end with a boss, *d*, as shown in Figs. 1 and 2.

D is the lamp-shade, which may be constructed of any suitable material. It is provided on its inner side with lugs *a a*, projecting inward from opposite sides, as shown in Figs. 1 and 2, each of which is provided near its end with an aperture, through which the rods C C respectively and easily pass. The lugs rest upon the bosses *d d* when the shade is in its proper position relative to the chimney.

E is an annular metal rim, which is of the proper diameter to fit loosely into the upper part of the shade.

F F are weights, which are permanently attached to the upper edge of the rim E on opposite sides of the same, and are each provided with a sheave-wheel, *e*, journaled thereto, so as to freely revolve.

G is a cross-bar, from which the lamp and its co-operating parts are suspended. *f f* are sheave-wheels journaled to the cross-bar G.

H H are cords which support the lamp. The lower ends of these cords are attached to the upper ends of the rods C C, respectively, from which they extend upward to and pass over the sheave-wheels *f f*, thence downward to and under the sheave-wheels *e e*, and thence upward to the cross-bar G, to the ends of which they are respectively permanently attached.

Permanently attached to the inner side of the weights, and on opposite sides of the rim, are eyebolts *g g*, through which the cords H H loosely pass for the purpose of holding the rim directly over the shade when detached therefrom.

J J are depending shafts, which are journaled within the lugs *a a* of the shade, and bent at their upper ends, so as to form hooks *n*, as shown in Fig. 2. The rim and weights F are heavy enough to counterbalance the lamp.

The arrangement of the cords and other parts is such that if the lamp be made to descend the weight will be carried upward, and when the rim is disconnected from the shade the rim will be carried up, leaving the shade upon the lamp, as shown in Fig. 2. As the weight counterbalances the lamp, it will be held at rest at any desired height. The arrangement of said hooks is such that when the rim is resting upon the shade the hooks, by a rotary movement of the shafts, are made to take over the lugs *h h* projecting inward on opposite sides of the rim, and thereby connect the rim and shade together, so that the shade can then be elevated with the rim when the lamp is lowered to be filled, or for other purpose, if desired. In this case, also, the lamp will be held at rest at any desired height by the weight.

Having thus described my invention, what I claim as new, and desire to secure by Letters Patent, is—

1. The combination of a hanging lamp, B, a shade, D, supported at a suitable distance above the lamp and adapted to move up and down with the same, cords or chains H, having their upper ends secured at a suitable distance above the lamp, and at their lower ends connected with the latter, sheaves *f*, and a counterbalancing-weight provided with sheaves *e*, substantially as and for the purpose described.

2. In a hanging lamp provided with means for raising and lowering the same, the combination of a lamp, a counterbalancing weighted rim, E, a shade, D, a locking device between the rim and the shade for connecting and disconnecting them, and means for supporting the shade when detached, whereby the shade may be caused to move with the lamp or with the rim, substantially as and for the purpose described.

3. In a hanging lamp, the combination, with the lamp B, of the cross-bar G, cords H H, weighted rim E, shade D, and locking-shafts J J, whereby the said weighted rim can be elevated with or without the shade, substantially as specified.

ELIJAH C. LAWRENCE.

Witnesses:
TYLER B. KING,
JAMES W. BEASLEY.